United States Patent [19]

Matsubara et al.

[11] Patent Number: 4,757,313
[45] Date of Patent: Jul. 12, 1988

[54] POSITIONING AND ABNORMALITY CONTROL DEVICE

[75] Inventors: Hideyuki Matsubara; Yoshito Kato; Toshio Hashimoto, all of Aichi, Japan

[73] Assignee: Toyota Jidosha Kabushiki Kaisha, Aichi, Japan

[21] Appl. No.: 887,972

[22] Filed: Jul. 24, 1986

Related U.S. Application Data

[63] Continuation of Ser. No. 650,991, Sep. 17, 1984, abandoned, which is a continuation-in-part of Ser. No. 367,662, Apr. 12, 1982, abandoned.

[30] Foreign Application Priority Data

May 6, 1981 [JP] Japan ................................ 56-67923

[51] Int. Cl.⁴ .................... G05B 25/02; G05B 21/00
[52] U.S. Cl. ....................... 340/825.160; 340/672; 340/870.16; 340/870.29
[58] Field of Search ............... 340/825.16, 672, 686, 340/680, 870.16, 870.28, 870.29; 324/165; 318/565, 603

[56] References Cited

U.S. PATENT DOCUMENTS

| | | | |
|---|---|---|---|
| 3,490,010 | 1/1970 | Bernard et al. | 340/686 |
| 3,514,627 | 8/1970 | Bridgeman | 340/686 |
| 3,551,649 | 12/1970 | Weber | 340/686 |
| 4,321,531 | 3/1982 | Marshall | 340/672 |
| 4,339,749 | 7/1982 | Yamada | 340/686 |
| 4,349,814 | 9/1982 | Akehurst | 340/686 |
| 4,366,705 | 1/1983 | Fuji et al. | 340/686 |
| 4,401,930 | 8/1983 | Kato et al. | 318/603 |
| 4,591,770 | 5/1986 | Isobe et al. | 340/680 |

OTHER PUBLICATIONS

"Circuit Indicates Direction of Rotation", W. Dorset, Electronic Product Design, Jun. 1981, p. 29.

*Primary Examiner*—Donald J. Yusko
*Attorney, Agent, or Firm*—Finnegan, Henderson, Farabow, Garrett and Dunner

[57] ABSTRACT

A positioning control device wherein an abnormality in a position detector is judged only by use of two position signals having differing phases emitted from the position detector for effecting position detection of a movable article without using the data of movement of the movable article to be controlled. For this purpose, direction determining means are provided which are responsive to the position signals to provide normal or reverse direction signals. A logical circuit for effecting abnormality judging of the position detector is provided in a controller for emitting a position control signal corresponding to the position signal to a control circuit for effecting position control of the movable article. When an abnormal condition occurs in the position detector, the signal aspect of the position signal emitted from the position detector is varied from that during the normal operation.

4 Claims, 6 Drawing Sheets

FIG.9A NORMAL ROTATION

FIG.9B REVERSE ROTATION

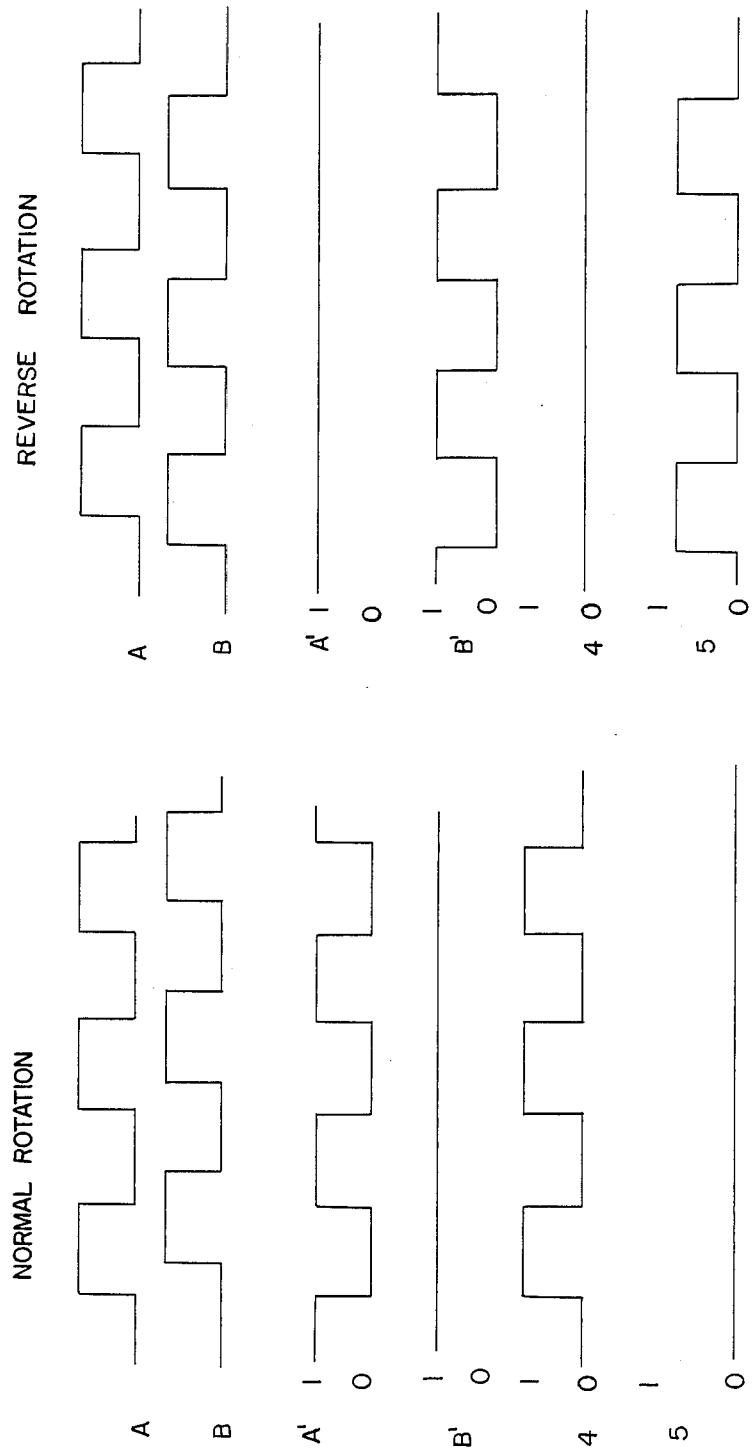

POSITIONING AND ABNORMALITY CONTROL DEVICE

This application is a continuation of application Ser. No. 650,991 filed Sept. 17, 1984, which is a continuation-in-part of Ser. No. 367,662, filed Apr. 12, 1982, both now abandoned.

BACKGROUND OF THE INVENTION

1. Field of the Invention

The present invention relates to a device for controlling positioning of a moving article and, more particularly, to a device with a position detector for detecting the position of a moving article and for determining the position of the moving article in accordance with the detected position. The present invention may be used for a machine tool and an industrial machine, and the moving article may be a workpiece operated upon by the machine tool.

2. Description of the Prior Art

It is very important to accurately sense a position of a moving article, for example, a tool of a machine tool, since the approach speed of the tool should be controlled in accordance with the relationship between a workpiece and the tool. The position of the tool is detected by a position detector, for example, a rotary encoder or a linear encoder. The output of the position detector is connected to a controller in which the position of the moving article is determined on the basis of the output of the position detector and which outputs a speed control signal to a control circuit. The control circuit comprises a drive circuit for a driving means for moving the moving article in accordance with the speed control signal from the control circuit. A positioning control device is composed by the position detector, the controller and the control circuit.

In such a positioning control device, abnormal conditions of the position detector or signal lines connected thereto cause the machine tool to malfunction. Thus, the positioning control device provides an abnormal condition detecting means which detects the abnormal conditions of the position detector and the like so that the controller feeds an abnormality judging signal to the control circuit to stop the moving article. The positioning control device mentioned above requires a signal line in addition to position signals 4 and 5 for detecting the abnormal conditions of the position detector and the like.

One method is performed such that an abnormality signal is generated by the position detector itself independently of a position signal, whereby an abnormal condition of the position detector is judged based on the abnormality signal. The other method is such that the controller monitors position signals from the position detector at all times, whereby a good or bad positional signal is judged based on the data of movement of an article to be controlled, and emits a signal of judgement.

There have been presented the disadvantages that, out of the above-described methods, the former method of detecting an abnormality needs an abnormality signal in addition to a position signal, while the latter method of detecting an abnormality requires that the data of movement of an article to be controlled must be transmitted to the controller by some means.

SUMMARY OF THE INVENTION

An object of the present invention is to provide a positioning control device in which an abnormal condition of a position detector and the like is judged without any additional signal lines connecting constituents of the positioning control device to each other.

Another object of the present invention is to provide a positioning control device wherein a mistaken position detection of a movable article due to an abnormality in a position detector can be prevented and a highly reliable positioning control can be effected.

BRIEF DESCRIPTION OF THE DRAWINGS

FIGS. 9A and 9B are detailed time charts showing the operation of the position detector of FIG. 8;

FIGS. 11A and 11B are detailed time charts showing the operational conditions of the positioning control device of FIG. 5.

DETAILED DESCRIPTION OF THE INVENTION

Figure 1:
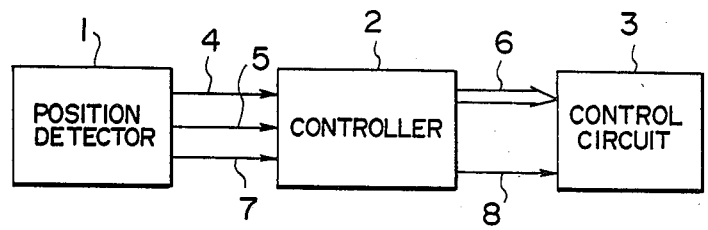
FIGS. 1 and 2 are block diagrams showing the arrangement of the conventional positioning control device.
Figure 3:
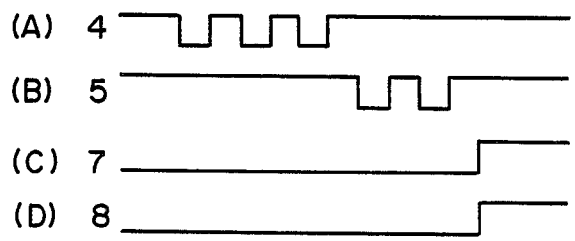
FIG. 3 is a time chart showing the operational conditions of the positioning control device illustrated in FIG. 1.

FIG. 1 shows the arrangement of the conventional positioning control device, and FIG. 3 shows the operational time chart thereof. Referring to these drawings, designated at 1 is a position detector for detecting a position of a movable article to be controlled, 2 a controller for feeding a positional control signal 6 in response to positional signals 4 and 5 fed from the position detector 1, and 3 a control circuit for controlling the position of the movable article in response to the position control signal 6. In addition, the aforesaid position signals 4 and 5 are fed alternatively in accordance with the moving direction (forward or rearward, for example) of the movable article.

In the above-described arrangement, if an abnormal condition takes place in the position detector 1, then a position detection abnormality signal 7 other than the position signals 4 and 5 is fed to the controller 2, which feeds an abnormality judging signal 8 in response to the position detection abnormality signal 8. An abnormality judgement is effected in the control circuit 3, whereby the positioning control of the movable article is interrupted.

Figure 7:
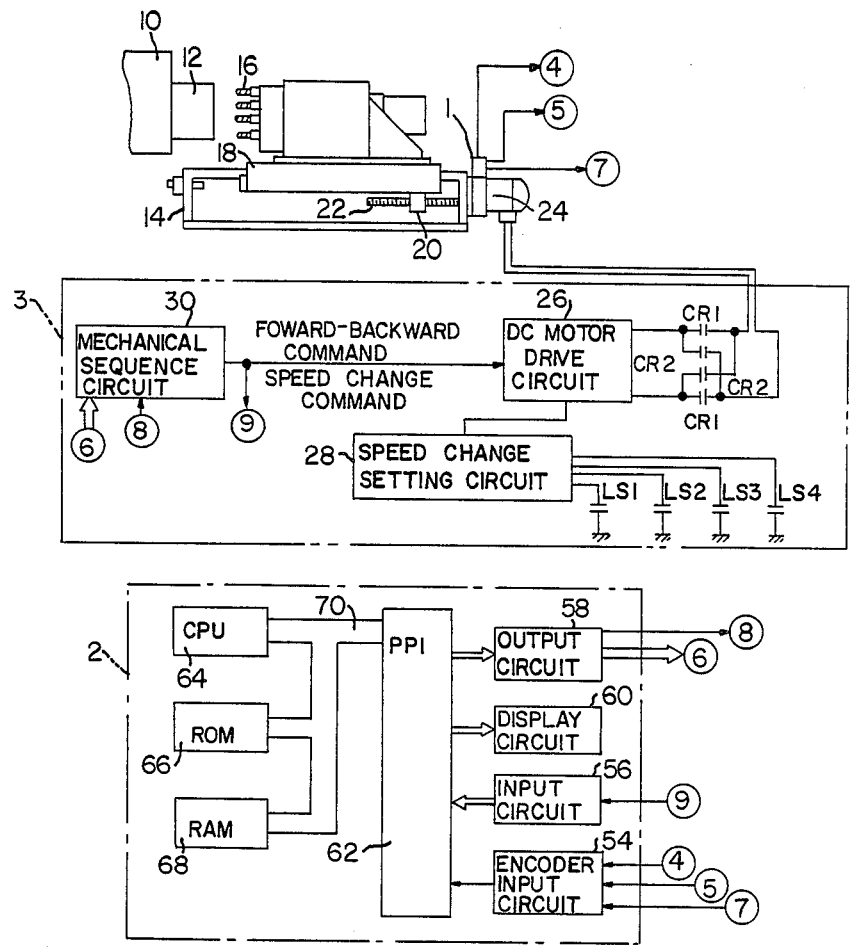
FIG. 7 is a detailed block diagram of the prior art positional control device shown in FIG. 1.
Figure 8:
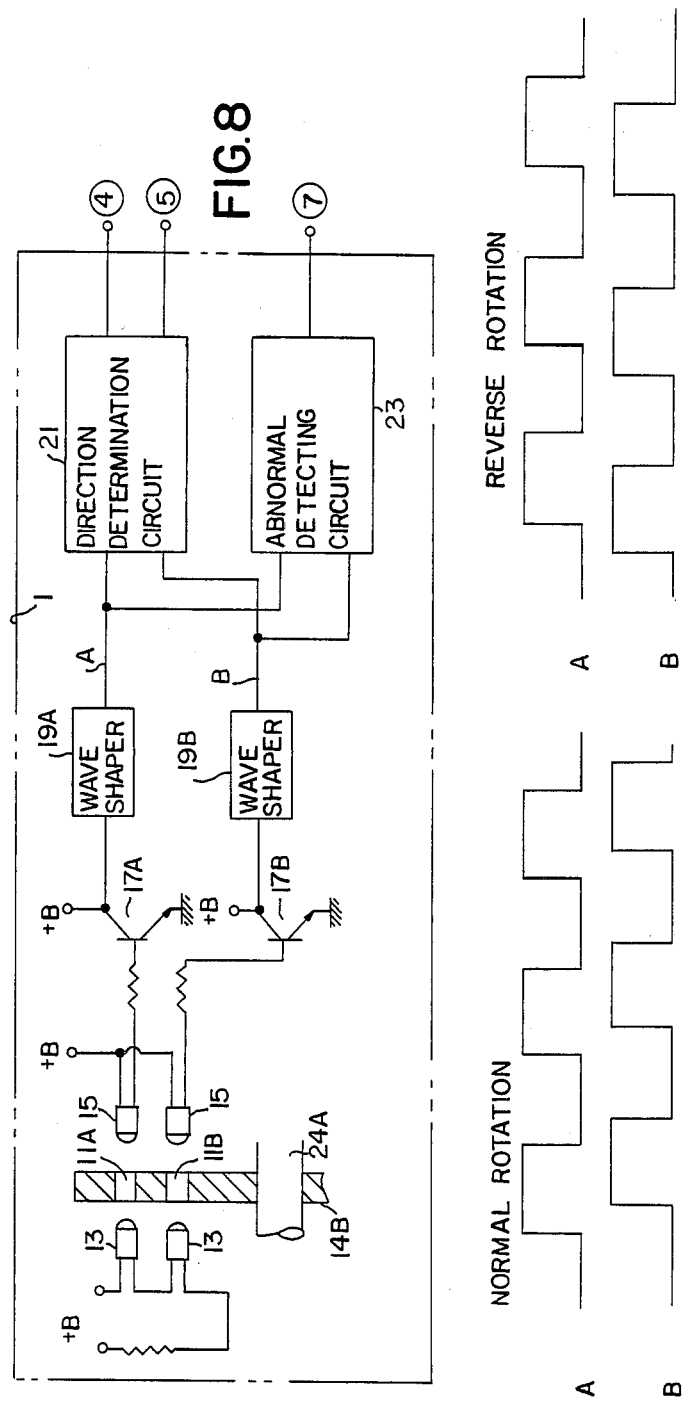
FIG. 8 is a detailed block diagram, partially schematic, of the prior art position detector shown in FIG. 1.

FIGS. 7 and 8 show a detailed example of the conventional positioning control device shown in FIG. 1 and applied to a machine tool. In FIG. 7, the machine tool includes a slide base 14 fixedly provided for working a workpiece 12 fixed on a jig 10; a slide table 18 supporting spindles 16 and movable in the forward and backward directions on the slide base 14; a DC motor 24 for moving the slide table 18 forward or backward by rotating a feed shaft 22 threadably coupled to a feed nut 20 solidly secured to the undersurface of the slide table 18.

FIG. 8 shows a detailed structure of the position detector 1. Referring to FIG. 8, a disk 24B is secured onto the shaft 24A of the DC motor 24 and has two alignments of a plurality of apertures 11A and 11B. Two pairs of light emitting diodes 13 and photo-diodes 15 are provided, and each two pairs of light emitting diodes 13 and photo-diodes 15 are faced through the disk 24B to each other. The outputs of the photo-diodes 15 are connected to the bases of transistors 17A and 17B whose collectors are connected with voltage supplies +B and inputs of wave shapers 19A and 19B. The outputs of the wave shapers 19A and 19B are connected to inputs of a direction determination circuit 21 and to an abnormal detecting circuit 23, respectively. When the shaft of the DC motor 24 rotates in a normal rotational direction, the wave shapers 19A and 19B feed positional signals A and B, as shown in FIG. 9A, to the direction determination circuit 21 which outputs normal and reverse direction signals 4 and 5, also as shown in FIG. 9A. When rotated in a reverse rotational direction, the wave shapers 19A and 19B feed the positional signals A and B, as shown in FIG. 9B. Such positional signals A and B having different phases are obtained by arrangement of the apertures 11A with respect to the apertures 11B. The direction determination circuit 21 judges whether the shaft 24A of the DC motor 24 rotates in the normal rotational direction or the reverse rotational direction in accordance with the positional signals A and B. The normal or reverse rotational direction is judged when the following conditions are met.

(1) Condition for normal rotational direction:
The positional signal B is low at the leading edge of the positional signal A;
the signal B is high at the trailing edge of the signal A;
the signal A is high at the leading edge of the signal B; and
the signal A is low at the trailing edge of the signal B.

(2) Condition for reverse rotational direction:
The positional signal B is high at the leading edge of the positional signal A;
the signal B is low at the trailing edge of the signal A;
the signal A is low at the leading edge of the signal B; and
the signal A is high at the trailing edge of the signal B.

The abnormal detecting circuit 23 outputs a position detecting abnormality signal 7 whose level is low when the above condition (1) or (2) is not met. The abnormality signal 7 having low level indicates that the position detector and the like are in an abnormal condition and causes the DC motor 27 to be stopped.

As shown in FIG. 7, the prior art controller 2 includes: an encoder input circuit 54 for receiving outputs 4, 5 and 7 from the circuit 1; an input circuit 56 for receiving a command 9 emitted from a mechanical sequence circuit 30; an output circuit 58 for outputting an abormality judging signal 8 and limit signals 6 enabling switches LS1-LS4 to be closed for speed control; a display programmable peripheral interface (hereinafter referred to as a "PPI") 62; a central operation processing unit (hereinafter referred to as a "CPU") 64; a Read Only Memory (hereinafter referred to as a "ROM") 66; a Random Access Memory (hereinafter referred to as a "RAM") 68; and a bus for connecting the above-described components to one another. In RAM 68 of this first controller 2, first present pulse numbers $P_1$-$P_4$ corresponding to control speed change positions are prestored.

The prior art control circuit 3 shown in FIG. 7 includes a DC motor drive circuit 26 for driving the DC motor 24; a mechanical sequence circuit 30 for receiving the limit signals, i.e., the speed control signals 6 and the abnormality judging signal 8, and for feeding the command 9 indicating that the motor 24 is in operation to the input circuit 54, a forward-backward command and a speed change command to the DC motor drive circuit 26; a speed change setting circuit 28 for setting a speed of the slide table 18 based on contact conditions of the switches LS1-LS4; and switches CR1 and CR2 associated with the DC motor drive circuit 26.

The thus constructed positioning control device necessitates a signal line connecting the abnormal detecting circuit 23 to the controller 2 and carrying the abnormal signal.

Figure 2:
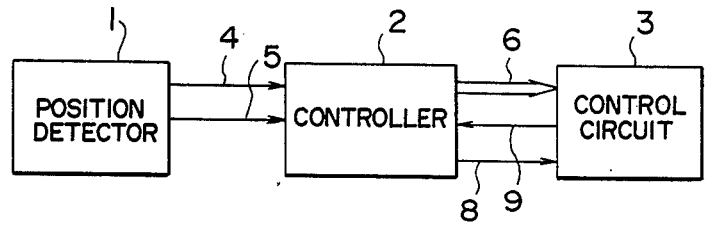
Figure 4:
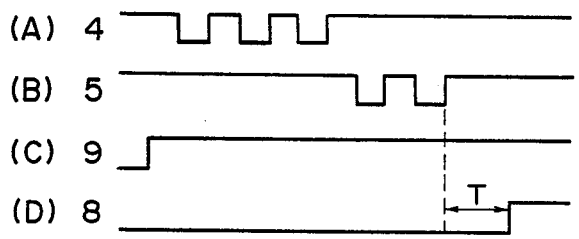
FIG. 4 is a time chart showing the operational conditions of the positioning control device illustrated in FIG. 2.

FIG. 2 shows the arrangement of another example of the conventional positioning control device and FIG. 4 shows the operational time chart thereof. Referring to these drawings, to monitor the presence of an abnormality in the position detector 1, the controller 2 takes in from the control circuit 3 the movement data 9 which shows that the article to be controlled is moving, and, when the article to be controlled is moving, if the position signals 4 and 5 from the position detector 1 show that there is no movement of the article to be controlled even after a predetermined period of time (the region of time T in FIG. 4), then the controller 2 feeds an abnormality judging signal 8.

In the second example, shown in FIG. 2, the abnormal condition is detected by the controller 2 in place of the abnormal detecting circuit 23. Accordingly, the position detector 1 does not include the abnormal detecting circuit 23 and the controller 2 has a programmed routine in the ROM 66 for judging the abnormality of the position detector 1 and the like. The remaining structure of the positioning control device shown in FIG. 2 is identical with the first example shown in FIG. 7.

The programmed routine comprises the steps of: judging whether the moving article to be controlled is in operation based on the movement data or the command 9 from the mechanical sequence circuit 30; monitoring the normal and reverse direction signals 4 and 5 from the direction determination circuit 21 as to whether they are generated successively within a predetermined period of time T; and generating the abnormality judging signal 8 when any of the normal and reverse direction signals are not generated after the time T has been lapsed. The second example mentioned above also has to provide an additional signal line connecting the controller 2 to the control circuit 3 and carrying the command 9.

As described above, according to the aforesaid latter method, in order to monitor the occurrence of an abnormal condition in the position detector, it is necessary to transmit the data of movement of the article to be controlled from the control circuit 3 to the controller 2.

Figure 5:
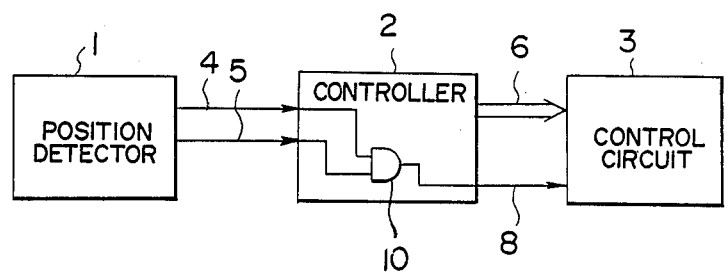
FIG. 5 is a block diagram showing the arrangement of the positioning control device according to the present invention.
Figure 6:
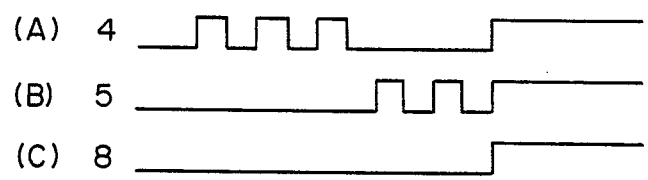
FIG. 6 is an operational time chart showing the arrangement of the positioning control device illustrated in FIG. 5.

FIG. 5 shows the arrangement of the positioning control device according to the present invention, and FIG. 6 shows the operational time chart thereof.

Differences of the positioning control device according to the present invention from the conventional positioning control device reside in firstly, that the position signals 4 and 5 fed from the position detector 1 are adapted to be emitted as logical level "0" signals when the article to be controlled is stopped in movement, secondly, that, when an abnormal condition takes place in the position detector 1, both the position signals 4 and 5 are adapted to be emitted as logical level "1" signals without using the position detection abnormality signal 7 from the position detector 1 as in the prior art, and, thirdly, that, if the position signals 4 and 5 are arranged to emit logical level "1" signals, then an AND gate 10 is adapted to emit a logical "1" signal, the controller 2 emits an abnormality judging signal 8 instantly without using the data of movement 9 of the article to be controlled from the control circuit 3 as in the conventional positioning control device.

More detailed description of the preferred embodiment according to the present invention shown in FIG. 5 will be given hereunder referring to FIGS. 10A and 10B. The same numerals as shown in FIGS. 7 and 9 are applied to the same elements and the elements similar to those shown in FIGS. 7 and 9. The overlapped description of these elements are omitted in the following explanation.

Figure 10A:
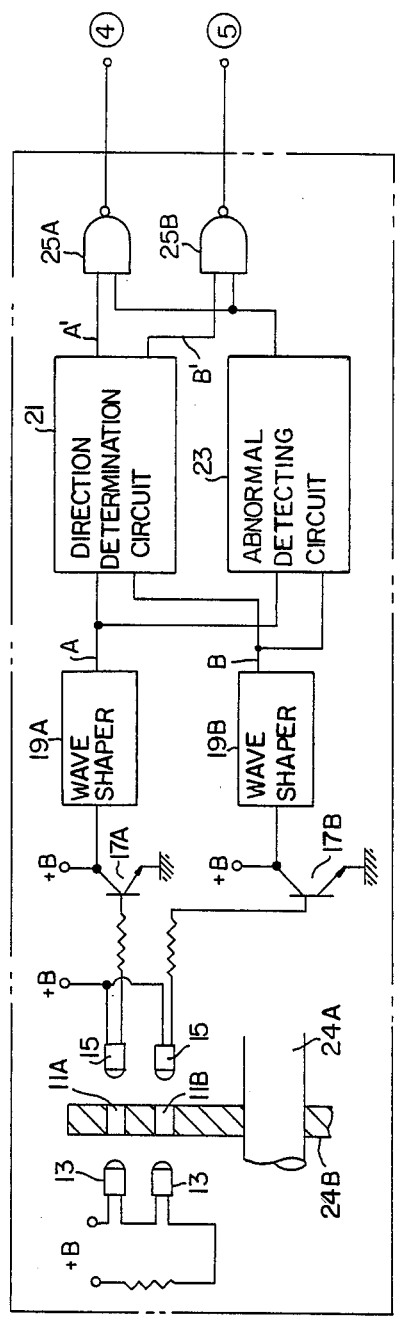
FIGS. 10A and 10B are detailed block diagrams, partially schematic, of the position detector and controller shown in FIG. 5.
Figure 10B:
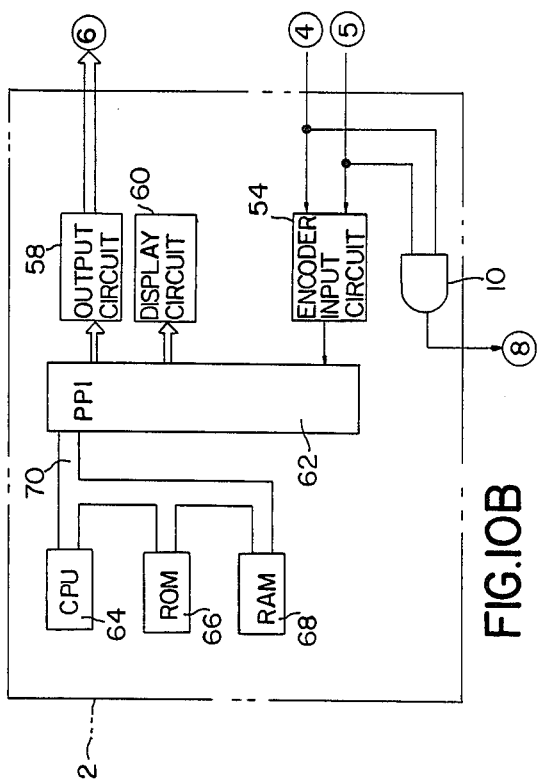

In FIG. 10A, outputs of the direction determination circuit 21 are connected to inputs of NAND gates 25A and 25B and an output of the abnormal detecting circuit 23 is connected to another input of the NAND gates 25A and 25B. Outputs of NAND gates 25A and 25B are used as the normal and reverse direction signals 4 and 5, respectively. The normal and reverse direction signals 4 and 5 are connected to the encoder input circuit 54 in the controller 2 and inputs of an AND gate 10 whose output is connected to the control circuit 3 as the abnormality judging signal 8.

Referring to FIGS. 11A and 11B, waveforms of the normal and reverse direction signals 4 and 5 are contrary to those shown in FIGS. 9A and 9B due to addition of the NAND gates 25A and 25B. In addition, it should be noted that, when the abnormal detecting circuit 23 detects the abnormality because the condition (1) or (2) for judging the abnormality of the position detector and the like mentioned above is not fulfilled, the output thereof becomes low level. Accordingly, both outputs of the NAND gates 25A and 25B become high level "1" due to the low level signal from the abnormal detecting circuit 23 and the abnormality judging signal 8 being "1" is outputted from the AND gate 27. Upon receiving the high level signal 8 by the control circuit 3, the DC motor 24 is stopped so that malfunction of the machine tool or the like is prevented.

In the above-described arrangement, the position signals 4 and 5 are emitted from the position detector 1 in accordance with the moving direction of the movable article, and fed to the AND gate 10 in the controller 2. When the position detector 1 is in the normal operation, the AND gate 10 is adapted to emit a logical "0" signal, no abnormality judging signal is emitted and the controller 2 feeds to the control circuit 3 a position control signal 6 corresponding to the aforesaid position signal 4 or 5.

On the other hand, when an abnormal condition takes place in the position detector 1, the position signals 4 and 5 fed from the position detector 1 to the AND gate 10 in the controller 2 are adapted to be emitted as logical "1" level signals, an abnormality judging signal 8 is fed from the AND gate 10 to the control circuit 3, and the control circuit 3 stops the positioning control of the movable article.

To detect an abnormal condition in the position detector 1 itself, there is provided abnormality detecting means operable only when a trouble occurs in a detecting element or an electric circuit incorporated in the position detector 1. This abnormality detecting means is constructed by the combination of publicly known techniques.

What is claimed is:
1. A positioning control device for controlling a position of a moving article comprising:
(A) a position detector including:
(a) a signal generating means for generating two positional signals having different phases to each other;
(b) a direction determination means responsive to said positional signals for determining any direction of movement of said moving article, and for producing a normal direction signal or a reverse direction signal in accordance with the determination thereof;
(c) an abnormal detecting means responsive to said positional signals for determining whether at least one of said positional signals is abnormal, and for generating a detecting signal when at least one of said positional signals is detected to be abnormal;
(d) a first logic circuit responsive to said normal direction signal, said reverse direction signal, and said detecting signal; and for making said normal and reverse direction signals to be inverted when an abnormality of said positional signals is not detected and to be a constant logic level when an abnormality is detected; and
(B) controller means, including at least a second logic circuit responsive to the output signals of said first logic circuit, for generating an abnormality judging signal in response to said normal and reverse direction signal being a constant logic level; and
(C) a control circuit responsive to said abnormality judging signal for at least stopping said moving article in response to said abnormality judging signal.

2. A positioning control device according to claim 1, wherein said signal generating means comprises:
two pairs of light emitting diodes and photo-diodes;
a disk rotating in directions corresponding to directions of movement of said moving article and having a plurality of apertures with respect to said two pairs of light emitting diodes and photo-diodes, the light emitted from said light emitting diodes being received through said apertures by said photo-diodes so that said photo-diodes output respective signals which have different phases; and
transistors connected to said photo-diodes, respectively, to feed said positional signals to both said direction determination circuit and abnormal detecting circuit.

3. A positioning control device according to claim 1, wherein said first logic circuit comprises two NAND gates having inputs connected to said direction determination circuit and said abnormal detecting circuit, said abnormal detecting circuit providing a logic low signal during detection of abnormality of said positional signals, and said second logic circuit comprises an AND gate having inputs connected to the outputs of said NAND gates and having an output connected to said control circuit.

4. A positioning control device according to claim 1 wherein said first logic circuit sets said normal and reverse direction signals to a logic high level when an abnormality is detected.

* * * * *